United States Patent
Leibov et al.

(10) Patent No.: US 11,479,336 B2
(45) Date of Patent: Oct. 25, 2022

(54) DIAGONAL PRESSURE DECK

(71) Applicant: The Boeing Company, Chicago, IL (US)

(72) Inventors: David Leibov, Seattle, WA (US); Ryan Scott Carruthers, Stanwood, WA (US); Mark Ronald McLaughlin, Snohomish, WA (US); Daniel Cox, Seattle, WA (US)

(73) Assignee: The Boeing Company, Chicago, IL (US)

( * ) Notice: Subject to any disclaimer, the term of this patent is extended or adjusted under 35 U.S.C. 154(b) by 229 days.

(21) Appl. No.: 16/721,741

(22) Filed: Dec. 19, 2019

(65) Prior Publication Data
US 2021/0188418 A1 Jun. 24, 2021

(51) Int. Cl.
*B64C 1/26* (2006.01)
*B64C 1/10* (2006.01)
*B64C 1/06* (2006.01)

(52) U.S. Cl.
CPC ............... *B64C 1/26* (2013.01); *B64C 1/061* (2013.01); *B64C 1/10* (2013.01)

(58) Field of Classification Search
CPC .. B64C 1/26; B64C 3/185; B64C 1/10; B64C 1/061; B64C 1/06; B64C 3/18; B64C 1/18; B64F 5/10
See application file for complete search history.

(56) References Cited

U.S. PATENT DOCUMENTS

| | | | |
|---|---|---|---|
| 2012/0138746 A1* | 6/2012 | Guillemaut | B64C 1/26 244/123.1 |
| 2015/0203185 A1 | 7/2015 | Rosman et al. | |
| 2017/0158306 A1* | 6/2017 | Kooiman | B64C 29/0033 |
| 2018/0362140 A1* | 12/2018 | Griess | B64C 1/26 |
| 2019/0100332 A1* | 4/2019 | Mindock | B05B 12/32 |
| 2021/0179250 A1* | 6/2021 | Vukosav | B64C 1/10 |

FOREIGN PATENT DOCUMENTS

| | | | |
|---|---|---|---|
| FR | 3105777 A1 * | 7/2021 | ............. B64C 1/064 |
| WO | WO-2018227298 A1 * | 12/2018 | ................ B64F 5/60 |

* cited by examiner

*Primary Examiner* — Joshua J Michener
*Assistant Examiner* — Ryan Andrew Yankey
(74) *Attorney, Agent, or Firm* — Kolisch Hartwell, P.C.

(57) ABSTRACT

Pressure decks, aircraft that incorporate the pressure decks, and methods of manufacturing the pressure decks, where the pressure decks include a planar center deck section configured to be attached to a keel beam of the aircraft and a pair of diagonal deck panels each extending inwardly and downwardly from a front wing spar to the planar center deck section. The pressure deck attaches the front wing spar to the keel beam at positions selected to minimize deflection stresses on the pressure deck exerted by relative movement between the front wing spar and the keel beam.

20 Claims, 8 Drawing Sheets

DIAGONAL PRESSURE DECK

FIELD

This disclosure relates generally to aircraft manufacture, and more specifically, to the manufacture of front wing spar pressure bulkheads or pressure decks for aircraft.

INTRODUCTION

Many large aircraft incorporate a central wing box that spans the width of the fuselage, where the central wing box is defined at the front and rear by a front wing spar and a rear wing spar, respectively. To the sides the central wing box is defined by the wing-fuselage joints by which the wings are attached to the fuselage.

The central wing box, and in particular the wing-fuselage joints, must necessarily be robust enough to support the weight of the wings as they depend from the fuselage while the aircraft is on the ground, but also to carry the load of the fuselage while in flight.

At the same time, the airframe must also support the weight of the fuselage as it extends forward and aft of the central wing box, which can create significant bending forces, as well as torsional forces, during flight. In the vicinity of the wing and main landing gear wheel well, the airframe will therefore typically include a keel beam that extends fore-and-aft along the center line of the aircraft at the bottom of the fuselage and provides structure and support for the fuselage in this region.

The attachment of the central wing box to the keel beam is therefore equivalent to the attachment of wings to the fuselage, and so must necessarily exhibit robust and reliable structural integrity in view of the strong forces the connection can be subject to. For example, the central wing box-fuselage connection often incorporates a longeron that connects the lower portion of the front wing spar to the fuselage, as the longeron can provide a strong load path in support of the wing box to fuselage connection.

The central wing box-fuselage interface is typically also the site of a pressure bulkhead or pressure deck, creating an airtight seal between the front wing spar and the fuselage cabin. This front wing spar pressure bulkhead and pressure deck is typically engineered to withstand the forces imposed by the wing and fuselage as well as the forces due to fuselage cabin air pressure, but if the pressure deck were only required to contain cabin air pressure, it could be engineered with far less material resulting in a savings in material costs as well as operational fuel costs.

SUMMARY

The present disclosure provides front wing spar pressure decks for aircraft, aircraft incorporating the front wing spar pressure decks, and methods of manufacturing the pressure decks.

In some examples, the present disclosure relates to a pressure deck for an aircraft that includes a planar center deck section configured to be attached to a lower edge of a front wing spar, and a pair of diagonal deck panels each coupled to an upper edge of the front wing spar adjacent to a fuselage of the aircraft, each diagonal deck panel extending inwardly and downwardly to the planar center deck section, where the pressure deck is attached to the front wing spar at one or more positions selected to minimize deflection stresses between the front wing spar and a keel beam of the aircraft.

In some examples, the present disclosure relates to an aircraft having a keel beam, a center wing box structure attached to the keel beam, the forward portion of the center wing box structure being defined by a front wing spar, a vertical pressure bulkhead adjacent to and forward of the front wing spar that is attached to the keel beam, and a pressure deck including a pair of deck panels; wherein an outboard end of each deck panel connects to an upper edge of the front wing spar and an inboard end of each deck panel connects to a lower edge of the front wing spar, so that each deck panel extends downwardly and inwardly toward the centerline of the aircraft, where the pair of deck panels, in combination, span a gap between a front surface of the front wing spar and the vertical pressure bulkhead to form a pressure seal. p In some examples, the present disclosure relates to a method of manufacturing a diagonal pressure deck for an aircraft, the method including modeling a substantially horizontal pressure deck for the aircraft, where the substantially horizontal pressure deck extends from a front surface of the front wing spar to a vertical pressure bulkhead forward of the front wing spar, modeling an amount of deflection of the substantially horizontal pressure deck that would occur during use of the aircraft, determining at least two locations disposed along the substantially horizontal pressure deck where the model indicates that the horizontal pressure deck is subject to a minimum of deflection forces, and constructing a diagonal pressure deck including two deck panels where an outboard end of each deck panel connects to an upper edge of the front wing spar and an inboard end of each deck panel connects to a lower edge of the front wing spar and is coupled to a keel beam of the aircraft at one of the determined locations, so that each deck panel extends downwardly and inwardly toward the centerline of the aircraft and the resulting pressure deck spans a gap between the front surface of the front wing spar and the vertical pressure bulkhead forward of the front wing spar.

Features, functions, and advantages can be achieved independently in various examples of the present disclosure, or can be combined in yet other examples, further details of which can be seen with reference to the following description and drawings.

DETAILED DESCRIPTION

Various aspects and examples of aircraft front wing spar pressure decks and pressure bulkheads, as well as related methods, are described below and illustrated in the associated drawings. Unless otherwise specified, a pressure deck as disclosed herein, and/or its various components may, but are not required to, contain at least one of the structures, components, functionalities, and/or variations described, illustrated, and/or incorporated herein. Furthermore, unless specifically excluded, the process steps, structures, components, functionalities, and/or variations described, illustrated, and/or incorporated herein may be included in other similar devices and methods, including being interchangeable between disclosed examples. The following description of various examples is merely illustrative in nature and is in no way intended to limit the examples, their applications, or their uses. Additionally, the advantages provided by the examples and embodiments described below are illustrative in nature and not all examples and embodiments provide the same advantages or the same degree of advantages.

This Detailed Description includes the following sections, which follow immediately below: (1) Definitions; (2) Overview; (3) Examples, Components, and Alternatives; (4) Illustrative Combinations and Additional Examples; (5) Advantages, Features, and Benefits; and (6) Conclusion.

Definitions

The following definitions apply herein, unless otherwise indicated.

"Substantially" means to be predominantly conforming to the particular dimension, range, shape, concept, or other aspect modified by the term, such that a feature or component need not conform exactly, so long as it is suitable for its intended purpose or function. For example, a "substantially cylindrical" object means that the object resembles a cylinder, but may have one or more deviations from a true cylinder.

"Comprising," "including," and "having" (and conjugations thereof) are used interchangeably to mean including but not necessarily limited to, and are open-ended terms not intended to exclude additional, unrecited elements or method steps.

Terms such as "first", "second", and "third" are used to distinguish or identify various members of a group, or the like, in the order they are introduced in a particular context and are not intended to show serial or numerical limitation, or be fixed identifiers for the group members.

"Coupled" means to be in such relation that the performance of one influences the performance of the other, may include being connected, either permanently or releasably, whether directly or indirectly through intervening components, and is not necessarily limited to physical connection(s).

Overview

Figure 1:
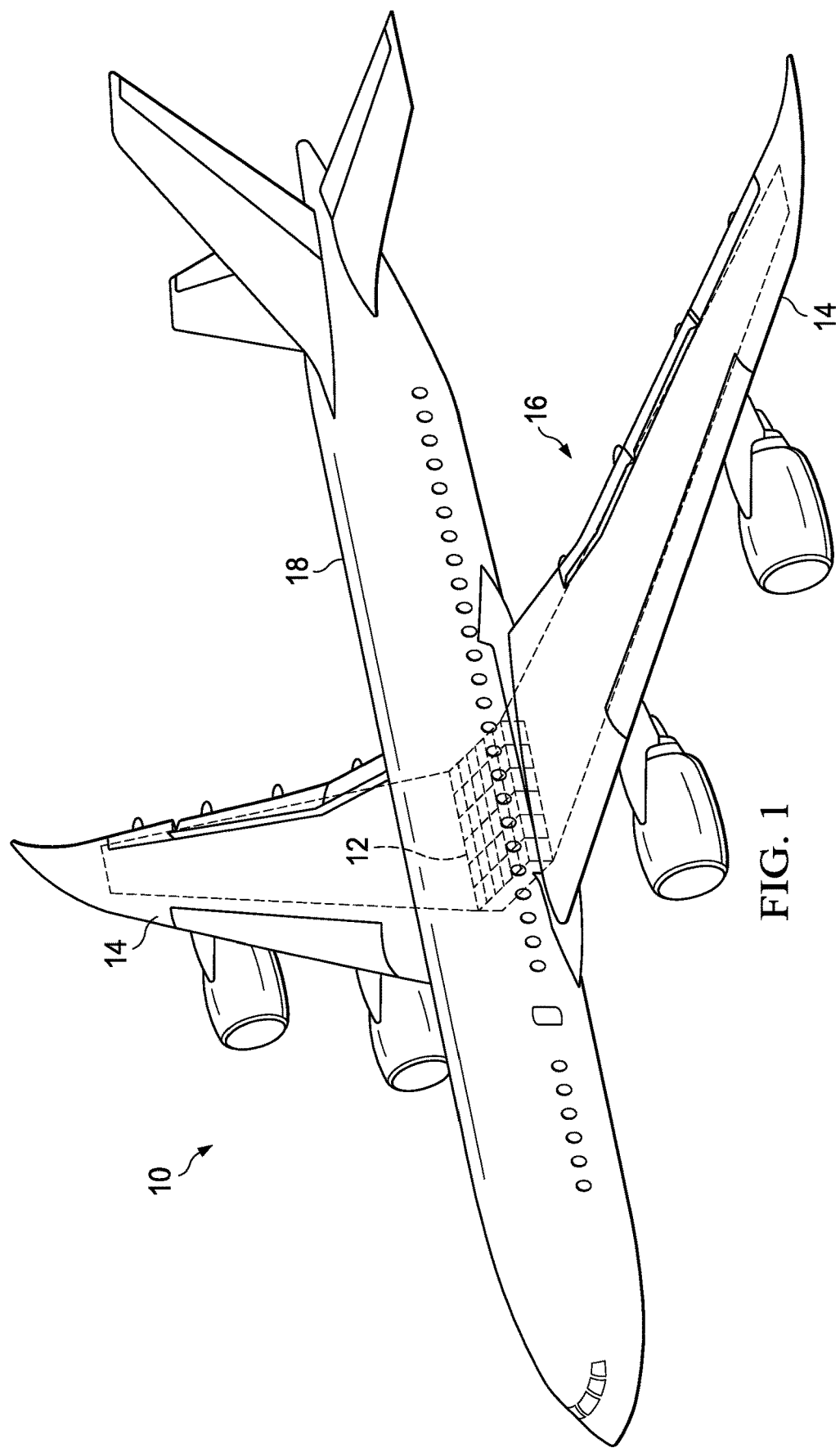
FIG. 1 is a schematic diagram of an illustrative aircraft, showing the location of the central wing box relative to the aircraft wings and fuselage.

An illustrative aircraft 10 is depicted in FIG. 1, showing the location of a center wing box 12, which provides a connection point for the wings 14 of aircraft 10, as well as connecting the resulting wing assembly 16 to the aircraft fuselage 18.

Figure 2:
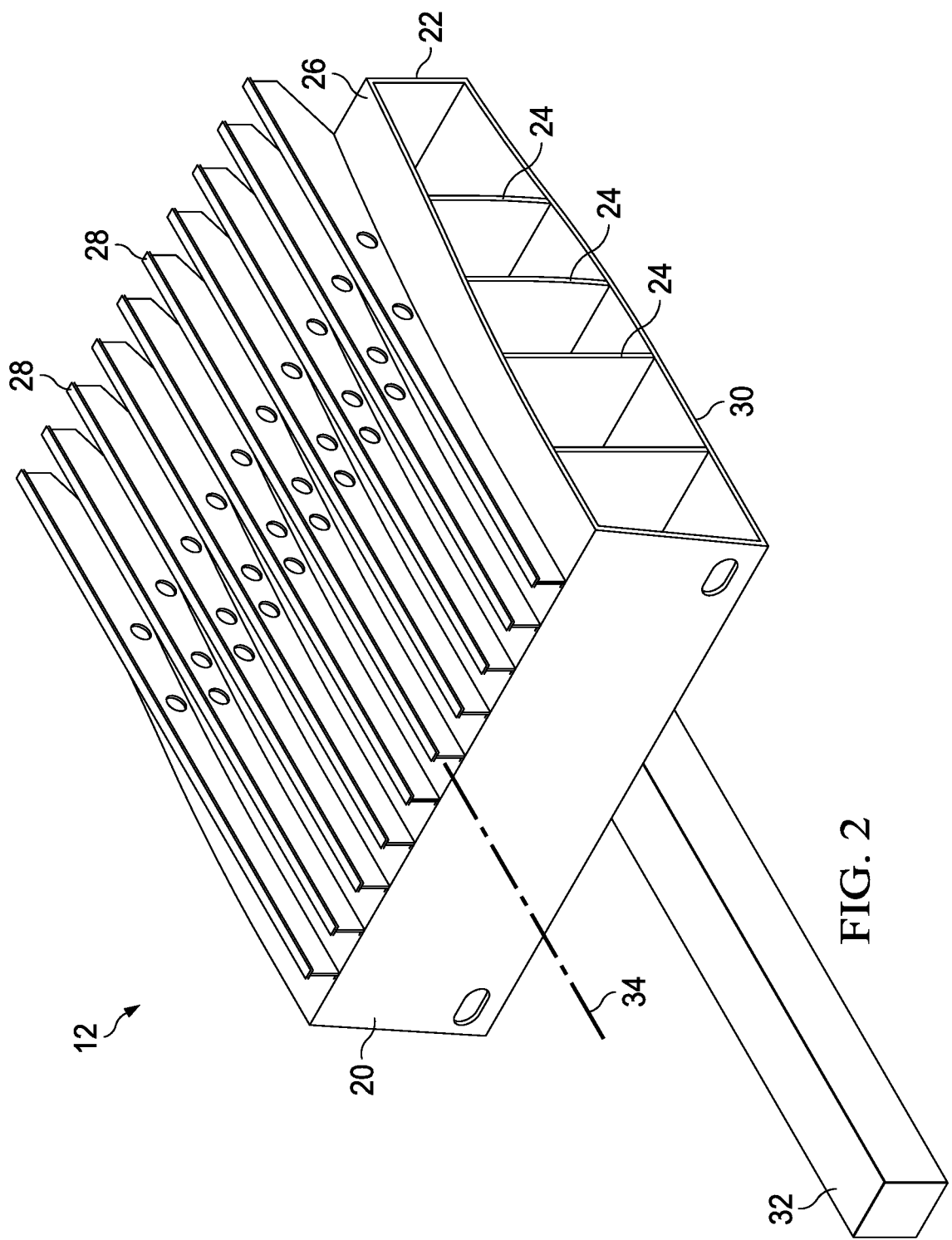
FIG. 2 is a schematic diagram of the central wing box and keel beam of an illustrative aircraft.

As shown in greater detail in FIG. 2, center wing box 12 is bounded fore and aft by a front wing spar 20 and a rear wing spar 22, respectively, with intermediate beams 24 distributed within center wing box 12 between front wing spar 20 and rear wing spar 22. The upper and lower surfaces of center wing box 12 are defined by an upper cover 26, which supports cabin floor beams 28, and a lower cover 30.

Also shown in FIG. 2 is a keel beam 32, which extends fore-and-aft along the centerline 34 of the aircraft at the bottom of fuselage 18. Keel beam 32 is engineered to provide strength to fuselage 18, and ensure a strong connection between the forward structure of the aircraft and the aft structure of the aircraft. Center wing box 12 is also connected to keel beam 32, in order to provide a robust structural connection between wing assembly 16 and fuselage 18.

Figure 3:
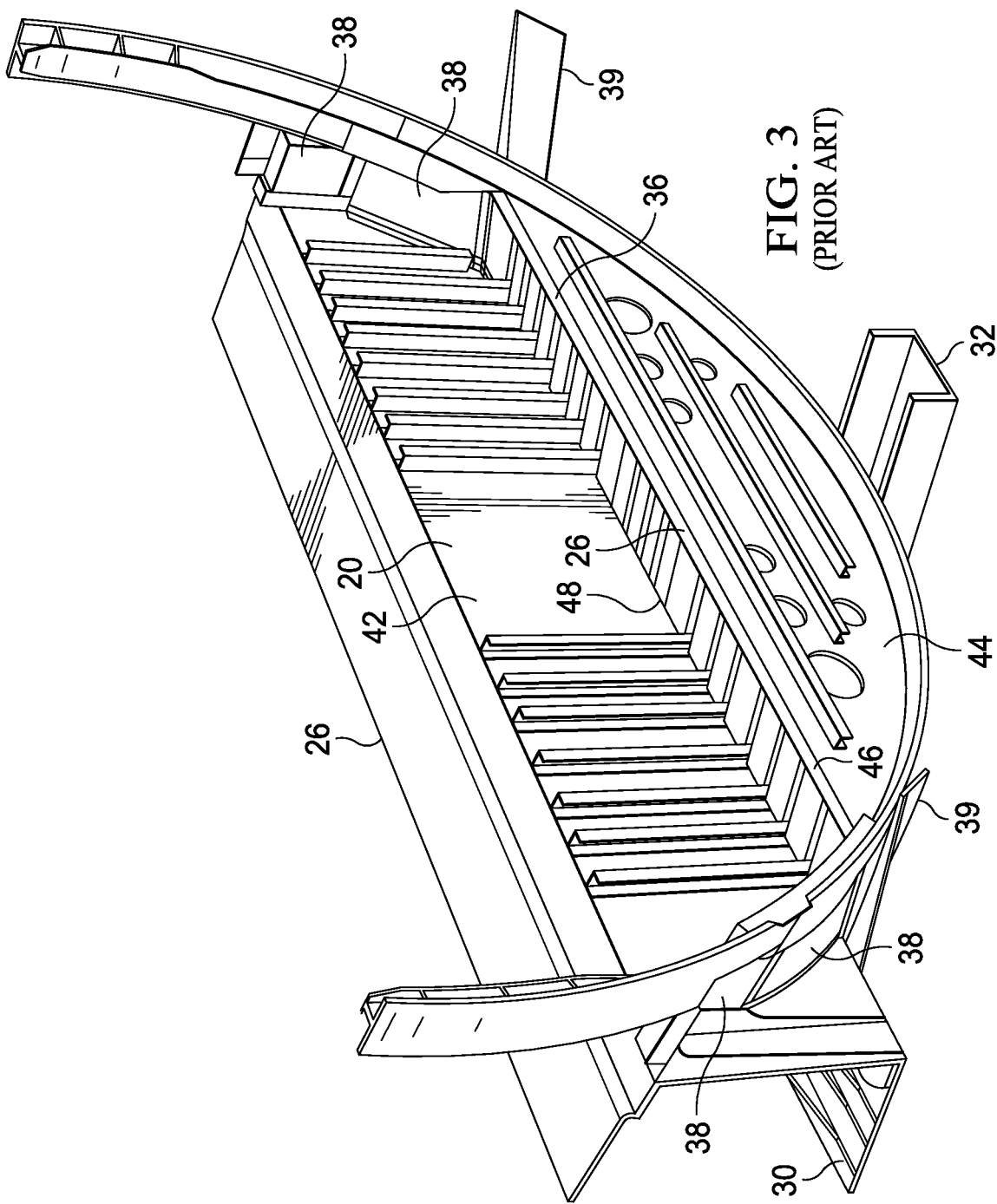
FIG. 3 depicts a conventional front wing spar pressure deck.
Figure 4:
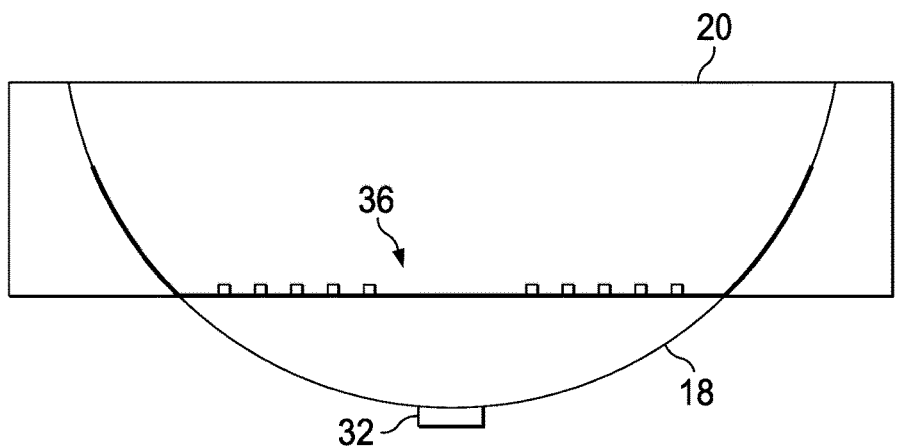
FIG. 4 is a simplified elevation view of the conventional pressure deck of FIG. 3, showing the relationship between the pressure deck, the central wing box, the fuselage, and the keel beam of an aircraft.

A prior art pressure deck 36 is depicted in FIG. 3. As shown, pressure deck 36 couples the front wing spar 20 to fuselage 18 via a horizontal pressure deck 36, curved panels 38 that are disposed at the port and starboard ends of pressure deck 36. Additional strength and resilience is provided by two extended longerons 39 that couple the front wing spar 20 to fuselage 18. The body 40 of pressure deck 36 extends horizontally from front wing spar 20, where it is coupled to the wing spar along the forward face 42 of the spar, to a vertical bulkhead 44, which may be a pressure bulkhead. FIG. 4 provides a simplified front elevation view of pressure deck 36, including curved panels 38, showing the relative position of pressure deck 36 with respect to front wing spar 20, keel beam 32, and the lower curve of fuselage 18.

Although center wing box 12 and vertical bulkhead 44 are each connected to keel beam 32, normal deflections by aircraft 10 during flight may subject pressure deck 36 to significant stresses as it spans the distance between front wing spar 20 and vertical bulkhead 44.

Figure 5:
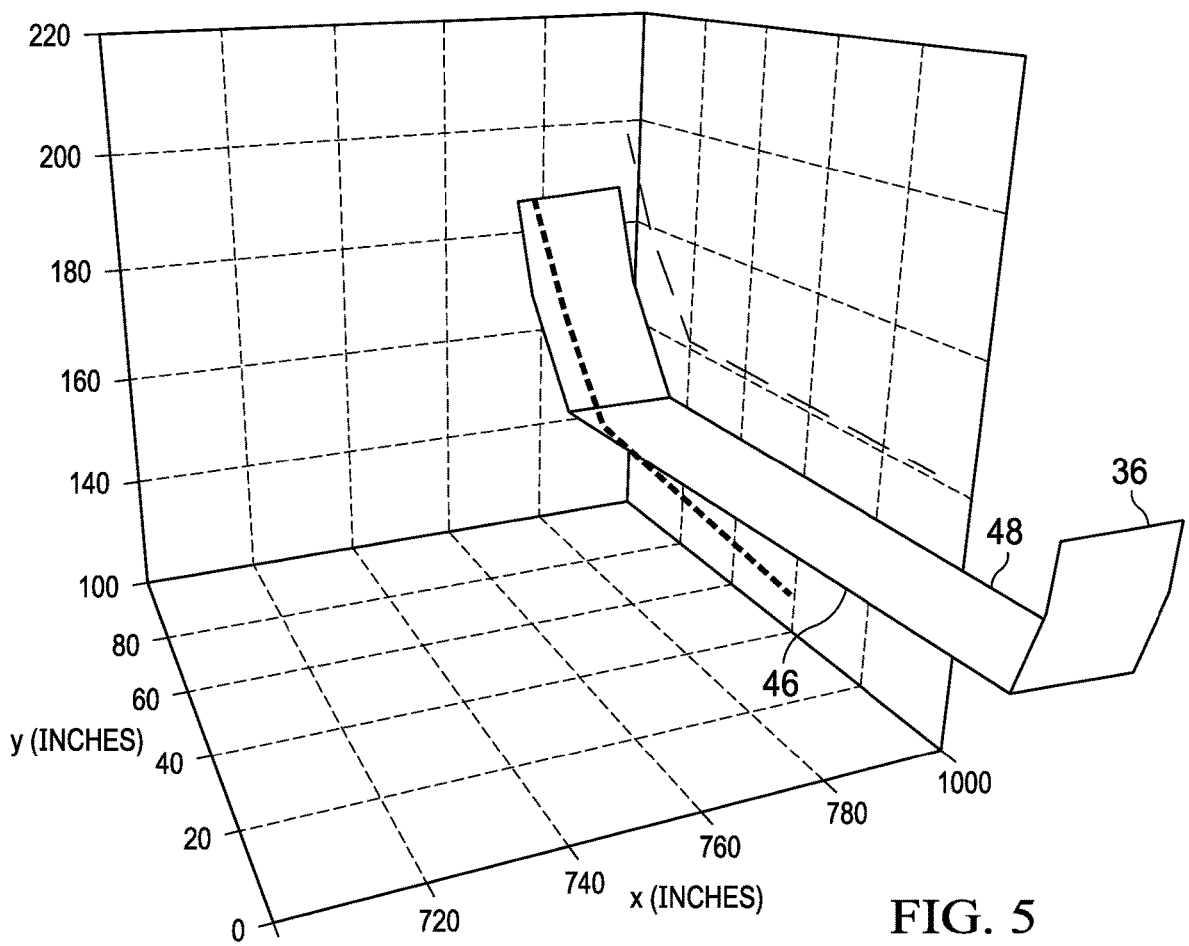
FIG. 5 is a three-dimensional plot showing deflections experienced by the conventional front wing spar pressure deck of FIG. 3 when the aircraft undergoes a 2.5 G maneuver.

In order to evaluate the stresses applied to pressure deck 36, the pressure deck was digitally modeled, and a plurality of contact points along a forward edge 46 and aft edge 48 of pressure deck 36 were defined. The digital model was then the subject of simulation modeling to calculate the relative deflections applied to pressure deck 36 during the equivalent of a 2.5 G aircraft maneuver. The results are shown in the plot of FIG. 5, which includes a depiction of pressure deck 36, and the amount of deflection experienced along forward edge 46 ( - - - - - ) and aft edge 48 ( — — — — — ) along the starboard half of pressure deck 36. In FIG. 5, the vertical deflections are depicted at 10× the scale of the illustrated pressure deck.

Although deflection stresses for only half of pressure deck 36 were calculated, the pressure deck was assumed to be symmetrically deflected. As shown, the largest stresses are experienced where the relative deflection between the wing and the vertical pressure bulkhead are the largest, corresponding to the outboard edges of pressure deck. Unlike the deflection along the aft edge 48, the deflection along forward edge 46 of pressure deck 36 shifts from extension deflection at the outboard end of pressure deck 36 to a compressive deflection at the center of pressure deck 36.

Figure 6:
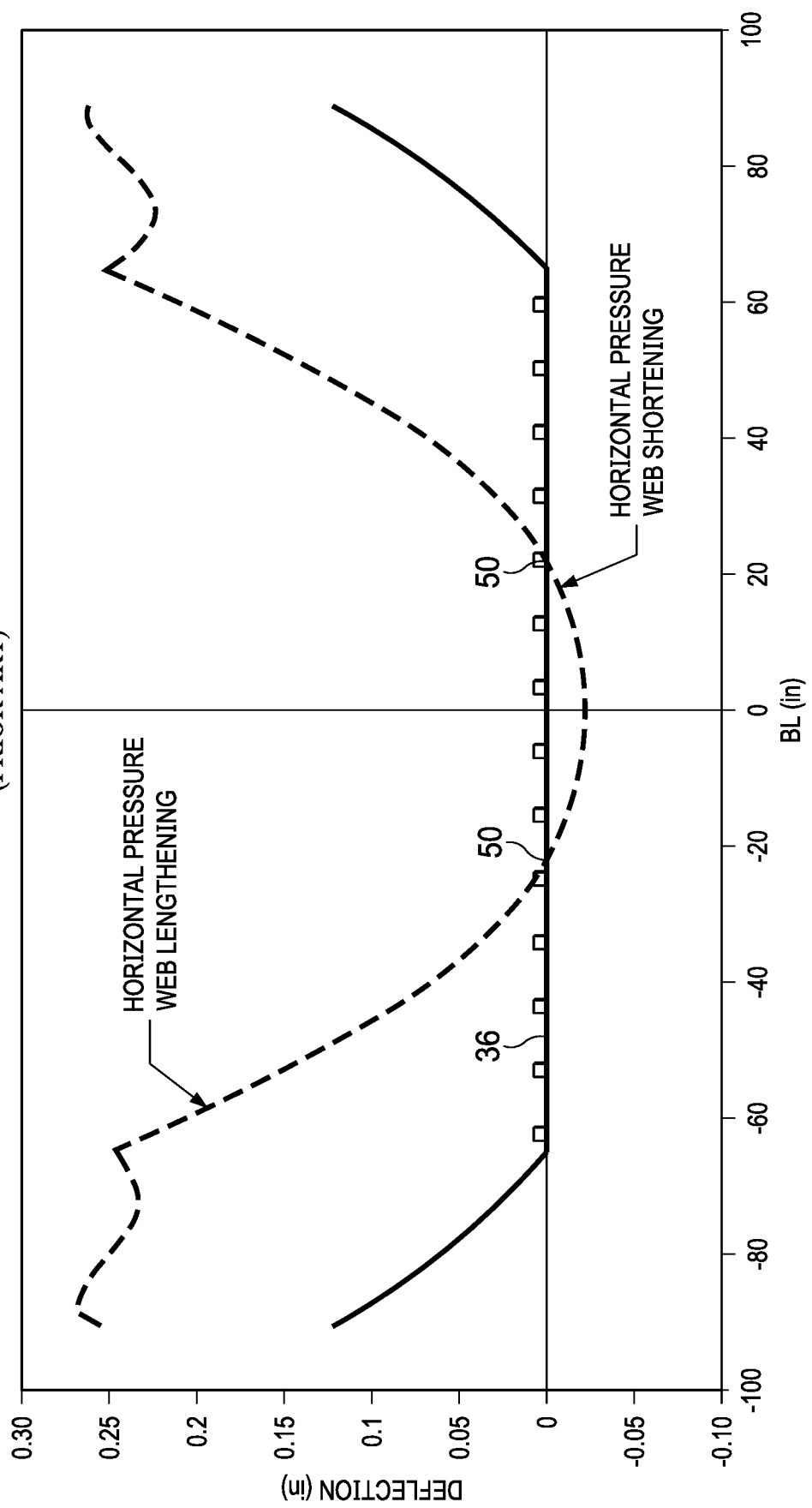
FIG. 6 is a plot illustrating the deflections shown in FIG. 5 superimposed upon the corresponding physical location that experiences those deflection forces along the pressure deck of FIG. 3.

FIG. 6 shows the relative deflection data between forward edge 46 and aft edge 48, as shown in FIG. 5, plotted versus the position of each contact point along pressure deck 36. A simplified front elevation view of pressure deck 36 is superimposed in alignment with the plot for reference. As shown, the relative deflection transitions from expansive at each end of pressure deck 36 to compressive at the center of pressure deck 36. There are two locations along the pressure deck, however, where approximately zero deflection is experienced, as indicated by arrows 50.

Figure 7:
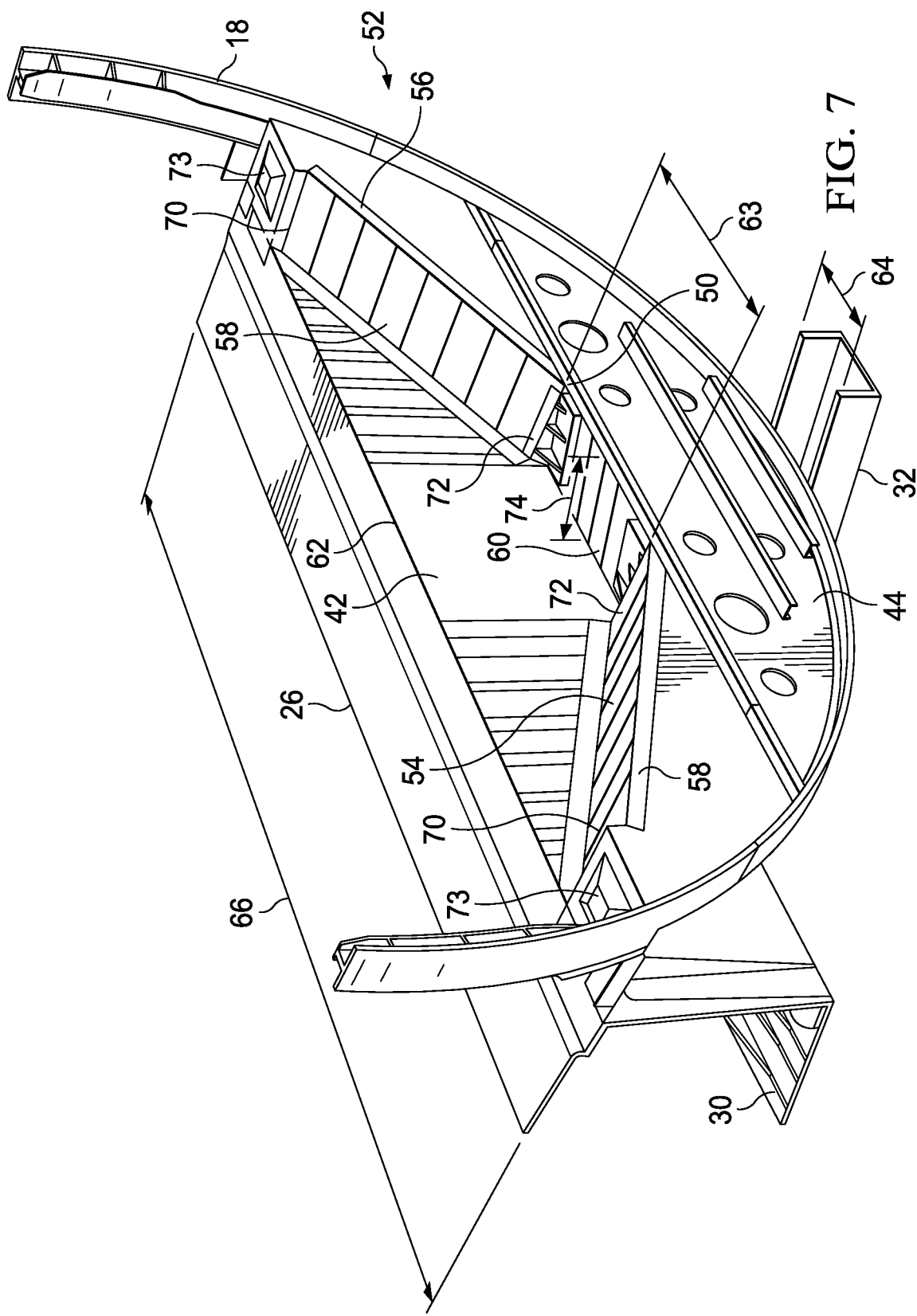
FIG. 7 is a diagram depicting an illustrative diagonal pressure deck according to the present disclosure and the relationship between the central wing box, the front wing spar, the pressure bulkhead, and the keel beam of an aircraft.

In contrast to prior art pressure deck 36, a diagonal pressure deck 52 according to the present disclosure may substantially reduce the kinds of deflection-induced stresses to which previous pressure decks, such as pressure deck 36, are subjected. An illustrative diagonal pressure deck 52 according to the present disclosure is depicted in FIG. 7. As shown, diagonal pressure deck 52 includes a planar center deck section 60 and a pair of diagonal deck panels 58. Planar center deck section 60 can be configured to be attached to a lower edge 61 of front wing spar 20. Diagonal deck panels 58 can each be coupled to upper edge 62 of front wing spar 20 adjacent to the fuselage 18 of the aircraft 10, and extend from upper edge 62 inwardly and downwardly from front wing spar 20 to planar center deck section 60.

Pressure deck 52 can be attached to front wing spar 20 at one or more positions selected to minimize deflection stresses between front wing spar 20 and keel beam 32 of aircraft 10. For example, pressure deck 52 can be configured so that planar center deck section 60 is attached to lower edge 61 of front wing spar 20 and coupled directly or indirectly to keel beam 32 of aircraft 10. Planar center deck section 60 can be attached directly to keel beam 32, but alternatively can be coupled indirectly to keel beam 32 via an intermediate structure. For example, planar center deck section 60 can be directly attached to a vertical bulkhead 44, and vertical bulkhead 44 can in turn be directly attached to keel beam 32, thereby indirectly coupling planar center deck section 60 to keel beam 32. Alternatively, diagonal pressure deck 52 can be configured so that it is attached to vertical bulkhead 44 along the entire forward edge 56 of diagonal pressure deck 52, and vertical bulkhead is in turn directly attached to keel beam 32. Alternatively, planar center deck section 60 can be directly attached to both lower edge 61 of front wing spar 20 and keel beam 32 of aircraft 10.

In every configuration, however, the attachment points of pressure deck 52 to both front wing spar 20 and keel beam 32 may be selected so as to minimize relative deflection between front wing spar 20 and keel beam 32.

Diagonal pressure deck 52 may be configured to be attached to a forward surface or face 42 of front wing spar 20 along an entire aft edge 54 of diagonal pressure deck 52. Alternatively, or in addition, diagonal pressure deck 52 may be configured to be attached to vertical bulkhead 44 along an entire forward edge 56 of diagonal pressure deck 52.

For example, referring to the plot of FIG. 6, diagonal pressure deck 52 may be sized and shaped so that each diagonal deck panel 58 attached to center deck section 60 at one of locations 50, where a connection between front wing spar 20 and keel beam 32 would be subject to a minimum of deflection stress. Planar center deck section 60 may be substantially planar, and positioned so as to be substantially aligned with the horizontal plane defined by aircraft 10.

Planar center deck section 60 may be disposed upon centerline 34 of aircraft 10, and further may be symmetrically disposed on centerline 34, so that planar center deck section 60 extends in a similar fashion towards both port and starboard substantially the same distance to define a width 63 of planar center deck section 60.

Planar center deck section 60 may have any suitable transverse width 63. Any planar center deck section 60 width that results in a decrease in deflection stress between front wing spar 20 and keel beam 32 is a suitable transverse width for planar center deck section 60. Planar center deck section 60 can have a transverse width 63 that is approximately equal to a transverse width 64 of keel beam 32, or slightly wider, or slightly less wide than width 64. Planar center deck section 60 can have a transverse width 63 that is greater than the width 64 of keel beam 32 and less than 25% of a width 66 of fuselage 18 of aircraft 10 as measured along upper edge 62 of front wing spar 20.

Diagonal deck panels 58 are configured to slope inwardly and downwardly to their points of attachment with planar center deck section 60. At any point along each diagonal deck panel 58, the panel can be substantially horizontal along a fore-aft line as the diagonal deck panel slopes inwardly and downwardly. Alternatively, a fore-aft cross-section of either of diagonal deck panels 58 may exhibit a small upward or downward angle from an aft edge to a forward edge of the diagonal deck panel 58.

As the configuration of diagonal pressure deck 52 is selected so as to minimize the amount of deflection stress that the pressure deck must withstand, diagonal pressure deck 52 can be manufactured to be lighter and/or thinner than more conventional pressure decks fulfilling the same function in an aircraft. As one example, diagonal deck panels 58 may each be sized and primarily structured to sufficiently resist a pressure load only. That is, as a diagonal pressure deck as described herein may not be required to withstand more severe deflection and torsion stresses imposed by relative deflections between the front wing spar 20 and vertical pressure bulkhead 44, and so diagonal pressure deck 52 can be sized and structured to be lighter, even permitting typically heavier structural supporting elements, such as for example a longeron 39 that would otherwise be used to secure front wing spar 20 relative to fuselage 18 (as shown in FIG. 3), could be eliminated.

Examples, Components, and Alternatives

The following sections describe selected aspects of exemplary diagonal pressure decks for use in aircraft, as well as methods of their manufacture. The examples in these sections are intended for illustration and should not be interpreted as limiting the entire scope of the present disclosure. Each section can include one or more distinct embodiments or examples, and/or contextual or related information, function, and/or structure.

A. Illustrative Aircraft Incorporating a Diagonal Pressure Deck

As shown in FIG. 7, an illustrative aircraft 10 that incorporates diagonal pressure deck 52 may include keel beam 32, and a center wing box structure 12 attached to keel beam 32, where the forward portion of center wing box structure 12 may be defined by front wing spar 20. Illustrative aircraft 10 may include a vertical pressure bulkhead 44 adjacent to and forward of front wing spar 20 that is attached to keel beam 32 and fuselage skin 68.

Diagonal pressure deck 52 may including a pair of deck panels where an outboard end 70 of each deck panel 58 connects to upper edge 62 of front wing spar 20, and an inboard end 72 of each deck panel 58 connects to the lower edge 61 of front wing spar 20 and is coupled directly or indirectly to keel beam 32. The outboard end 70 of each deck panel 58 may include an outer deck portion 73 that is attached to upper edge 62 of front wing spar 20 adjacent fuselage 18 of aircraft 10. Diagonal pressure deck 52 may be configured so that each deck panel 58 extends downwardly and inwardly toward centerline 34 of aircraft 10, and the pair of deck panels 58, in combination, span a gap 74 between front surface 42 of front wing spar 20 and vertical pressure bulkhead 44 to form a pressure seal.

Diagonal pressure deck 52 may connect directly to keel beam 32 at a location 50 selected to minimize deflection stresses applied to diagonal pressure deck 52. Alternatively, diagonal pressure deck 52 may connect indirectly to keel beam 32 via an intermediate structure, such as pressure bulkhead 44. More specifically, inboard end 72 of each pressure deck panel 58 may connect to an intermediate structure at a location selected to minimize deflection stresses applied to diagonal pressure deck 52. In particular, inboard end 72 of each deck panel 58 may be coupled directly or indirectly to keel beam 32 at a location and in a manner selected to minimize longitudinal compression and/or expansion stresses applied to diagonal pressure deck 52.

Figure 8:
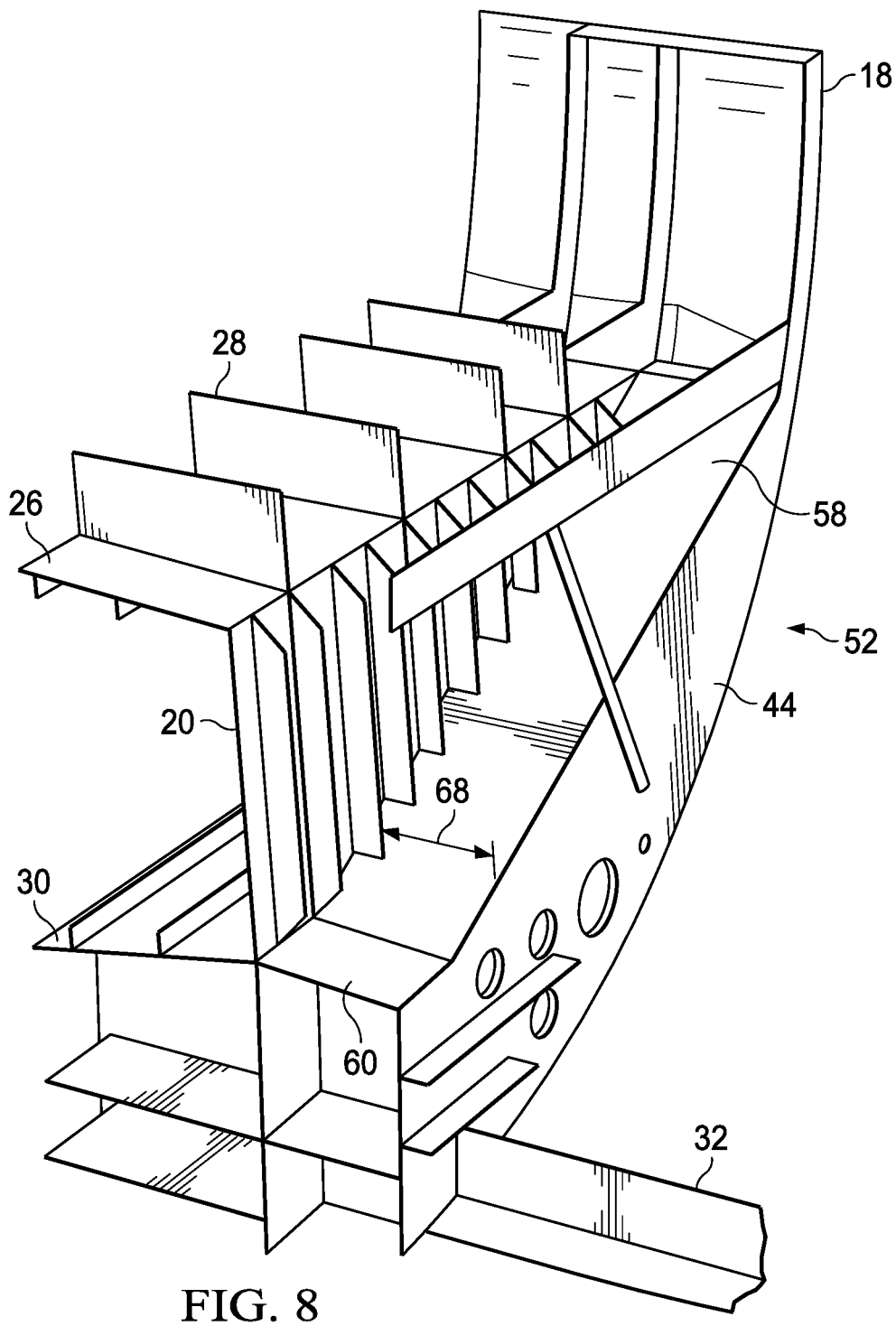
FIG. 8 is a cross-sectional view of alternative and illustrative diagonal pressure deck according to the present disclosure.

An alternative configuration of pressure deck 52 is shown in cutaway view in FIG. 8.

B. Illustrative Method of Manufacturing a Diagonal Pressure Deck

Figure 9:
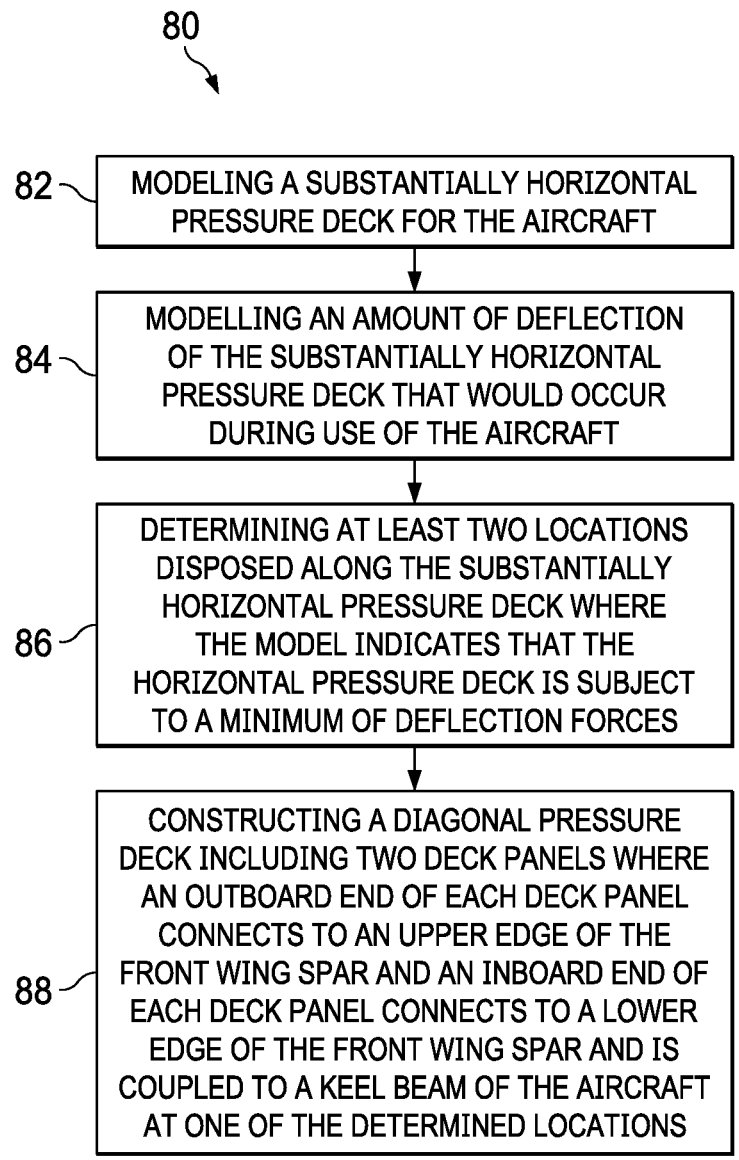
FIG. 9 is a flowchart depicting steps of an illustrative method of manufacturing a diagonal pressure deck for an aircraft.

This section describes steps of an illustrative method of manufacturing a diagonal pressure deck for an aircraft, as shown in flowchart 80 of FIG. 9. The illustrative method may include modeling a substantially horizontal pressure deck for the aircraft, at step 82 of flowchart 80, where the substantially horizontal pressure deck extends from a front surface of the front wing spar to a vertical pressure bulkhead forward of the front wing spar. The illustrative method may include modeling an amount of deflection of the substantially horizontal pressure deck that would occur during use of the aircraft, at step 84 of flowchart 80. The method may further include determining at least two locations disposed along the substantially horizontal pressure deck where the model indicates that the horizontal pressure deck is subject to a minimum of deflection forces, at step 86 of flowchart 80. The method may further include constructing a diagonal pressure deck, at step 88 of flowchart 80, the diagonal pressure deck including two deck panels where an outboard end of each deck panel connects to an upper edge of the front wing spar and an inboard end of each deck panel connects to a lower edge of the front wing spar and is coupled to a keel beam of the aircraft at one of the determined locations, so that each deck panel extends downwardly and inwardly toward the centerline of the aircraft and the resulting pressure deck spans a gap between the front surface of the front wing spar and the vertical pressure bulkhead forward of the front wing spar.

Step 88 of constructing the diagonal pressure deck of flowchart 80 may include constructing two deck panels so that the inboard ends of the deck panels connect to a lower edge of the front wing spar and are coupled indirectly to the keel beam of the aircraft at one of the determined locations.

Step 88 of constructing the diagonal pressure deck of flowchart 80 may include constructing two deck panels that extend downwardly and inwardly toward the centerline of the aircraft and connect to the keel beam at two points separated by a distance that is at least equal to a transverse width of the keel beam.

Step 88 of constructing the diagonal pressure deck of flowchart 80 may include constructing two deck panels that extend symmetrically downwardly and inwardly toward the centerline of the aircraft.

Step 88 of constructing the diagonal pressure deck of flowchart 80 may include constructing an outer deck at an outboard end of each of the deck panels and attaching each outer deck to an upper edge of the front wing spar adjacent a fuselage of the aircraft.

C. Digital Modeling of Pressure Decks

The illustrative method of manufacturing a diagonal pressure deck described above includes the steps of: modeling a substantially horizontal pressure deck for the aircraft, where the substantially horizontal pressure deck extends from a front surface of the front wing spar to a vertical pressure bulkhead forward of the front wing spar, at step 82 of flowchart 80; modeling an amount of deflection of the substantially horizontal pressure deck that would occur during use of the aircraft, at step 84 of flowchart 80; and determining at least two locations disposed along the substantially horizontal pressure deck where the model indicates that the horizontal pressure deck is subject to a minimum of relative deflection between the front wing spar and the vertical pressure bulkhead, at step 86 of flowchart 80.

Modeling a pressure deck, as used herein, refers to simulation modeling of a pressure deck. Simulation modeling may include creating and analyzing a digital model of a physical model to predict its performance in the real world, and in particular, how a part may react under certain conditions, how a part might fail, and what loads it may withstand.

Any process or procedure of digital simulation modeling that can provide the desired deflection and stress data needed for the recited method is a suitable process or procedure for the present application. In one aspect, the digital simulation modeling of the recited method may include:

- Using a 2D or 3D CAD (Computer Aided Design) tool to develop a virtual model, or digital model, of the desired pressure deck;
- Generating a 2D or 3D mesh for analysis calculations;
- Define appropriate structural properties for the digital model, as well as defining the location and magnitude of applied loads;
- Performing a finite element analysis in order to obtain the desired result, specifically a determination at least two locations disposed along the substantially horizontal pressure deck where the digital model indicates that the horizontal pressure deck is subject to a minimum of deflection forces during flight.

Any program or application that is capable of carrying out Computer Aided Design (CAD) may be useful for creating a digital model for a desired pressure deck design. An appropriate program may be purchased as an off-the-shelf software component. Alternatively or in addition, the program may be created in whole or in part specifically for modeling the components of a pressure deck, as described.

The analysis required to carry out the desired simulation modeling may be carried out on a suitable data processing system, which may include a communications framework to provide communications between one or more processor units, memory, persistent storage, communications units, input/output (I/O) units, and displays.

Instructions for an operating system, applications, and/or programs utilized for the simulation modeling may be located in one or more storage devices in communication with the one or more processor units through the communications framework. The instructions may be in a functional form on a persistent storage. These instructions may be loaded into a memory for execution by a processor unit.

These instructions may be referred to as program instructions, program code, computer usable program code, or computer readable program code that may be read and executed by a processor. The program code in the different embodiments may be embodied on different physical or computer-readable media, or combination of computer-readable media.

Where requisite program instructions are specifically prepared for carrying out the desired simulation modeling, the program code for carrying out the modeling may be written in one or any combination of programming languages, including an object-oriented programming language such as Java, Smalltalk, C++, and/or the like, and conventional procedural programming languages, such as the C programming language. The program code may execute entirely on a user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), and/or the connection may be made to an external computer (for example, through the Internet using an Internet Service Provider).

D. Illustrative Combinations and Additional Examples

This section describes additional aspects and features of the disclosed diagonal pressure decks, presented without limitation as a series of paragraphs, some or all of which can be alphanumerically designated for clarity and efficiency. Each of these paragraphs can be combined with one or more other paragraphs, and/or with disclosure from elsewhere in this application in any suitable manner. Some of the paragraphs below expressly refer to and further limit other paragraphs, providing without limitation examples of some of the suitable combinations.

A1. A pressure deck for an aircraft, comprising a planar center deck section configured to be attached to a lower edge of a front wing spar; and a pair of diagonal deck panels each coupled to an upper edge of the front wing spar adjacent to a fuselage of the aircraft, each diagonal deck panel extending inwardly and downwardly to the planar center deck section; where the pressure deck is attached to the front wing spar at one or more positions selected to minimize deflection stresses between the front wing spar and a keel beam of the aircraft.

A2. The pressure deck of paragraph A1, where the planar center deck section is attached to the lower edge of the front wing spar and coupled to the keel beam of the aircraft.

A3. The pressure deck of paragraph A1, where the planar center deck section is attached to both the lower edge of the front wing spar and the keel beam of the aircraft.

A4. The pressure deck of paragraph A1, where the planar center deck section has a transverse width that is at least equal to a transverse width of the keel beam.

A5. The pressure deck of paragraph A1, where the pressure deck is configured to be attached to a front surface of the front wing spar along an entire aft edge of the pressure deck.

A6. The pressure deck of paragraph A1, where the pressure deck is configured to be attached to a pressure bulkhead along an entire forward edge of the pressure deck.

A7. The pressure deck of paragraph A1, where the pressure deck connects the front wing spar to a vertical pressure bulkhead, the fuselage of the aircraft, and the keel beam so as to minimize a relative deflection between the front wing spar and the keel beam.

A8. The pressure deck of paragraph A1, where the pressure deck is configured to obviate a longeron that restrains the front wing spar relative to a fuselage.

A9. The pressure deck of paragraph A1, where the diagonal deck panels are primarily sized and structured sufficiently to resist a pressure load only.

A10. The pressure deck of paragraph A1, where the pair of diagonal deck panels each include an outer deck end that is attached to an upper edge of the front wing spar adjacent a fuselage of the aircraft.

B1. An aircraft, comprising a keel beam; a center wing box structure attached to the keel beam, the forward portion of the center wing box structure being defined by a front wing spar; a vertical pressure bulkhead adjacent to and forward of the front wing spar that is attached to the keel beam; and a pressure deck including a pair of deck panels; wherein an outboard end of each deck panel connects to an upper edge of the front wing spar and an inboard end of each deck panel connects to a lower edge of the front wing spar, so that each deck panel extends downwardly and inwardly toward a centerline of the aircraft; where the pair of deck panels, in combination, span a gap between a front surface of the front wing spar and the vertical pressure bulkhead to form a pressure seal.

B2. The aircraft of paragraph B1, where the inboard end of each of the deck panels connects to a lower edge of the front wing spar and is coupled to the keel beam at a location selected to minimize deflection stresses applied to the pressure deck.

B3. The aircraft of paragraph B1, where the inboard end of each of the deck panels connects to a lower edge of the front wing spar and is coupled indirectly to the keel beam via an intermediate structure, and the inboard end of each pressure panel connects to the intermediate structure at a location selected to minimize a deflection stresses applied to the pressure deck.

B4. The aircraft of paragraph B3, wherein the inboard end of each deck panel connects to the intermediate structure at a location selected to minimize longitudinal compression and/or expansion stresses applied to the pressure deck.

B5. The aircraft of paragraph B1, wherein each of the pair of deck panels extends symmetrically downwardly and inwardly toward the centerline of the aircraft and connect to a lower edge of the front wing spar and are coupled to the keel beam at two points that are separated by at least a transverse width of the keel beam.

C1 A method of manufacturing a diagonal pressure deck for an aircraft, comprising: modeling a substantially horizontal pressure deck for the aircraft, where the substantially horizontal pressure deck extends from a front surface of the front wing spar to a vertical pressure bulkhead forward of the front wing spar; modeling an amount of deflection of the substantially horizontal pressure deck that would occur during use of the aircraft; determining at least two locations disposed along the substantially horizontal pressure deck where the model indicates that the horizontal pressure deck is subject to a minimum of deflection forces; and constructing a diagonal pressure deck including two deck panels where an outboard end of each deck panel connects to an upper edge of the front wing spar and an inboard end of each deck panel connects to a lower edge of the front wing spar and is coupled to a keel beam of the aircraft at one of the determined locations, so that each deck panel extends downwardly and inwardly toward a centerline of the aircraft and the resulting pressure deck spans a gap between the front surface of the front wing spar and the vertical pressure bulkhead forward of the front wing spar.

C2. The method of paragraph C1, where constructing the diagonal pressure deck includes constructing two deck panels so that the inboard ends of the deck panels connect to a lower edge of the front wing spar and are coupled indirectly to the keel beam of the aircraft at one of the determined locations.

C3. The method of paragraph C1, where constructing the diagonal pressure deck includes constructing two deck panels that extend downwardly and inwardly toward the centerline of the aircraft and connect to the keel beam at two points separated by a distance that is at least equal to a transverse width of the keel beam.

C4. The method of paragraph C1, where constructing the diagonal pressure deck includes constructing two deck panels that extend symmetrically downwardly and inwardly toward the centerline of the aircraft.

C5. The method of paragraph C1, where constructing the diagonal pressure deck includes constructing an outer deck at an outboard end of each of the deck panels and attaching each outer deck to an upper edge of the front wing spar adjacent a fuselage of the aircraft.

Advantages, Features, and Benefits

The different examples of the diagonal pressure decks, aircraft, and methods of manufacture described herein provide several advantages over known solutions for coupling center wing boxes to pressure bulkheads and/or keel beams.

Existing structural connections between wing assemblies and aircraft fuselage must be robust due to the stress and relative deflection exerted upon such connections. Any connection between a horizontal pressure deck to the forward fuselage would therefore need to be strong enough, i.e. large and heavy enough, to hold back the kind of large deflections of the wings relative to the fuselage. But the size and weight of such a structure serves no engineering purpose other than to maintain cabin air pressure.

By making a pressure deck connection between the front wing spar and the keel beam at a location that produces minimal deflection, the load that must be withstood by the pressure deck is dramatically reduced, and the resulting pressure deck need only be engineered to withstand a pressure load.

This results in lighter, more fuel-efficient aircraft, as well as a reduction in materials needed for construction.

No known pressure deck apparatus or system possesses these advantageous properties. However, not all examples described herein may provide the same advantages or the same degree of advantage.

Conclusion

The disclosure set forth above may encompass multiple distinct examples with independent utility. Although each of these has been disclosed in its preferred form(s), the specific examples thereof as disclosed and illustrated herein are not to be considered in a limiting sense, because numerous variations are possible. To the extent that section headings are used within this disclosure, such headings are for organizational purposes only. The subject matter of the disclosure includes all novel and nonobvious combinations and subcombinations of the various elements, features, functions, and/or properties disclosed herein. The following claims particularly point out certain combinations and subcombinations regarded as novel and nonobvious. Other combinations and subcombinations of features, functions, elements, and/or properties may be claimed in applications claiming priority from this or a related application. Such claims, whether broader, narrower, equal, or different in scope to the original claims, also are regarded as included within the subject matter of the present disclosure.

What is claimed is:

1. A pressure deck for an aircraft, comprising
a planar center deck section configured to be attached to a lower edge of a front wing spar; and
a pair of diagonal deck panels each coupled to an upper edge of the front wing spar adjacent to a fuselage of the aircraft, each diagonal deck panel extending inwardly and downwardly to the planar center deck section;
wherein each of the pair of diagonal deck panels is attached to the planar center deck section at a position that is inward toward a center line of the aircraft from the fuselage and not adjacent to the fuselage.

2. The pressure deck of claim 1, wherein the planar center deck section is attached to the lower edge of the front wing spar and coupled to a keel beam of the aircraft.

3. The pressure deck of claim 1, wherein the planar center deck section is attached to both the lower edge of the front wing spar and a keel beam of the aircraft.

4. The pressure deck of claim 1, wherein the planar center deck section has a transverse width that is at least equal to a transverse width of a keel beam of the aircraft.

5. The pressure deck of claim 1, wherein the pressure deck is configured to be attached to a front surface of the front wing spar along an entire aft edge of the pressure deck.

6. The pressure deck of claim 1, wherein the pressure deck is configured to be attached to a pressure bulkhead along an entire forward edge of the pressure deck.

7. The pressure deck of claim 1, wherein the pressure deck connects the front wing spar to a vertical pressure bulkhead, the fuselage of the aircraft, and a keel beam of the aircraft so as to minimize a relative deflection between the front wing spar and the keel beam.

8. The pressure deck of claim 1, wherein the pressure deck is configured to obviate need for a longeron that restrains the front wing spar relative to a fuselage.

9. The pressure deck of claim 1, wherein the diagonal deck panels are -sized and structured to resist cabin air pressure only.

10. The pressure deck of claim 1, wherein the pair of diagonal deck panels each include a horizontal outer deck end that is attached to an upper edge of the front wing spar adjacent a fuselage of the aircraft.

11. An aircraft, comprising a keel beam;
a center wing box structure attached to the keel beam, a forward portion of the center wing box structure being defined by a front wing spar;
a vertical pressure bulkhead adjacent to and forward of the front wing spar that is attached to the keel beam; and
a pressure deck including a pair of deck panels and a center deck section, wherein an outboard end of each deck panel connects to an upper edge of the front wing spar, and an inboard end of each deck panel connects to a lower edge of the front wing spar, so that each deck panel extends downwardly and inwardly toward a centerline of the aircraft;
wherein the pair of deck panels and the center deck section, in combination, span a gap between a front surface of the front wing spar and the vertical pressure bulkhead to form a pressure seal, and
wherein the center deck section has a transverse width that is less than a combined transverse width of the pair of deck panels.

12. The aircraft of claim 11, wherein the inboard end of each deck panel connects to a lower edge of the front wing spar at a location along the front wing spar that is subject to least deflection between the front wing spar and the vertical pressure bulkhead.

13. The aircraft of claim 11, wherein the inboard end of each deck panel connects to a lower edge of the front wing spar and is coupled indirectly to the keel beam via an intermediate structure, and the inboard end of each deck panel connects to the intermediate structure at a location along the front wing spar that is subject to least deflection between the front wing spar and the vertical pressure bulkhead.

14. The aircraft of claim 13, wherein the inboard end of each deck panel connects to the intermediate structure at a location along the front wing spar that is subject to least compression and/or expansion of the pressure deck during aircraft maneuvers.

15. The aircraft of claim 11, wherein each of the pair of deck panels extends symmetrically downwardly and inwardly toward the centerline of the aircraft and connect to a lower edge of the front wing spar and are coupled to the keel beam at two points that are separated by at least a transverse width of the keel beam.

16. The pressure deck of claim 1, wherein each of the positions is spaced from the fuselage by at least a transverse width of the corresponding one of the pair of diagonal deck panels.

17. The aircraft of claim 11, wherein the transverse width of the center deck section is less than half a width of a fuselage of the aircraft as measured along an upper edge of the front wing spar.

18. The aircraft of claim 11, wherein the transverse width of the center deck section is greater than a width of the keel beam and less than 25% of the width of a fuselage of the aircraft as measured along the upper edge of the front wing spar.

19. The aircraft of claim 11, wherein the transverse width of the center deck section is less than a transverse width of the vertical pressure bulkhead as measured along a lower edge of the vertical pressure bulkhead.

20. An aircraft, comprising:

a keel beam;

a front wing spar;

a vertical pressure bulkhead adjacent to and forward of the front wing spar that is attached to the keel beam; and a pressure deck including a pair of diagonal deck panels and a center deck section, wherein each diagonal deck panel extends inwardly toward a centerline of the aircraft and away from a fuselage of the aircraft to the center deck section, the center deck section being spaced from the fuselage;

wherein the pair of diagonal deck panels and the center deck section, in combination, span a gap between a front surface of the front wing spar and the vertical pressure bulkhead to form a pressure seal.

* * * * *